United States Patent [19]
Breeden et al.

[11] Patent Number: 5,345,500
[45] Date of Patent: Sep. 6, 1994

[54] METHOD AND APPARATUS FOR COMPLETING INBOUND CALLS IN A WIRELESS COMMUNICATION SYSTEM

[75] Inventors: Robert L. Breeden, Boca Raton; Thomas V. D'Amico, both of Boca Raton, Fla.

[73] Assignee: Motorola, Inc., Schaumburg, Ill.

[21] Appl. No.: 912,423

[22] Filed: Jul. 13, 1992

[51] Int. Cl.⁵ .......................................... H04M 11/00
[52] U.S. Cl. ....................................... 379/63; 379/57; 379/58; 379/61
[58] Field of Search ........................ 379/57, 61, 63, 58, 379/56; 340/825, 825.36, 825.44

[56] References Cited

U.S. PATENT DOCUMENTS

| | | | |
|---|---|---|---|
| 4,747,122 | 5/1988 | Bhagat et al. | 379/57 |
| 4,953,198 | 8/1990 | Daly et al. | 379/61 |
| 5,109,400 | 4/1992 | Patsiokas et al. | 379/57 |
| 5,134,643 | 7/1992 | Iwata | 379/63 |
| 5,202,912 | 4/1993 | Breeden et al. | 379/57 |
| 5,239,572 | 8/1993 | Saegusa et al. | 379/61 |
| 5,255,308 | 10/1993 | Hashimoto et al. | 379/61 |
| 5,260,993 | 11/1993 | Breeden et al. | 379/58 |

FOREIGN PATENT DOCUMENTS

| | | |
|---|---|---|
| 56-07548 | 1/1981 | Japan . |
| 0212761A2 | 8/1986 | United Kingdom . |

OTHER PUBLICATIONS

Published by the European Telecommunications Standards Institue, "CT2 Common Air Interface" Jun. 30, 1991, Version: 1.1.

Primary Examiner—Curtis Kuntz
Assistant Examiner—William D. Cumming
Attorney, Agent, or Firm—R. Louis Breeden; Thomas G. Berry

[57] ABSTRACT

A method and apparatus completes inbound calls for portable communication units (120) in a wireless communication system comprising portable communication units (120) and fixed communication units (102). The fixed communication unit (102) provides wireless communications over a limited coverage area (108, 110, 112) and provides coupling to a telephone system (114). The fixed communication unit (102) has at least one wireless transmission channel carrying call set-up signaling in a first mode and user communications in a second mode. The method includes in the fixed communication unit (102) the step of generating (708) more than one sequence of periodic call set-up polls on a wireless transmission channel for polling a portable communication unit (120) having an inbound call. The sequence coexists with other sequences of periodic call set-up polls being generated concurrently on the same wireless transmission channel.

17 Claims, 5 Drawing Sheets

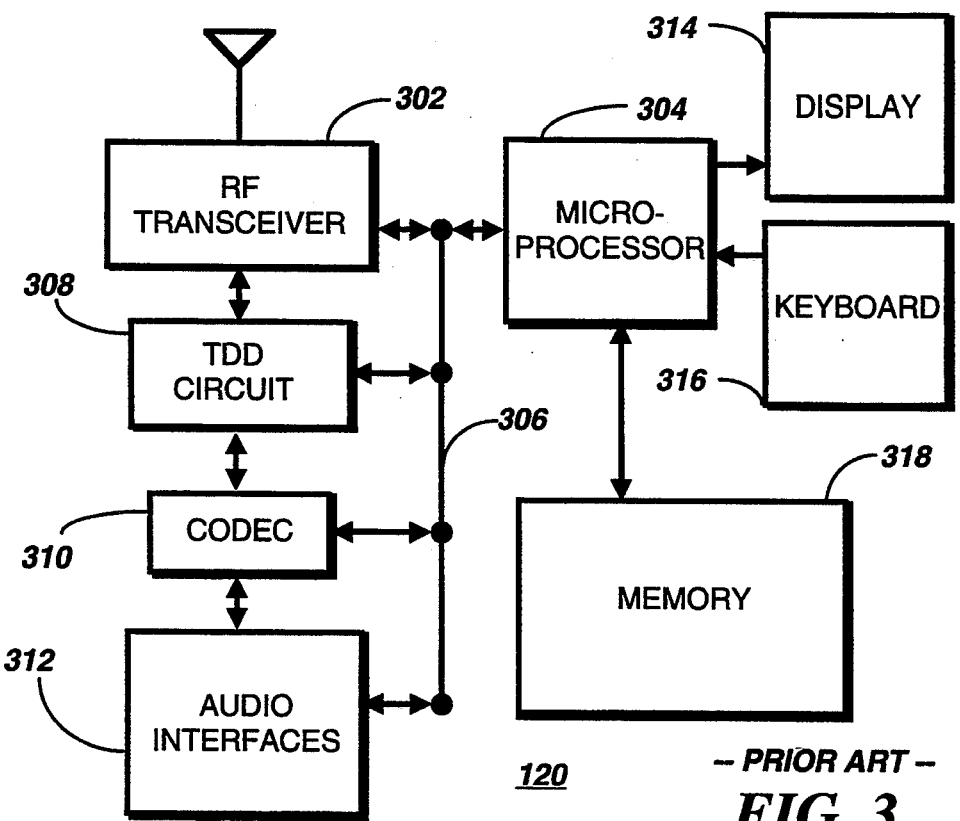
– PRIOR ART –
FIG. 3
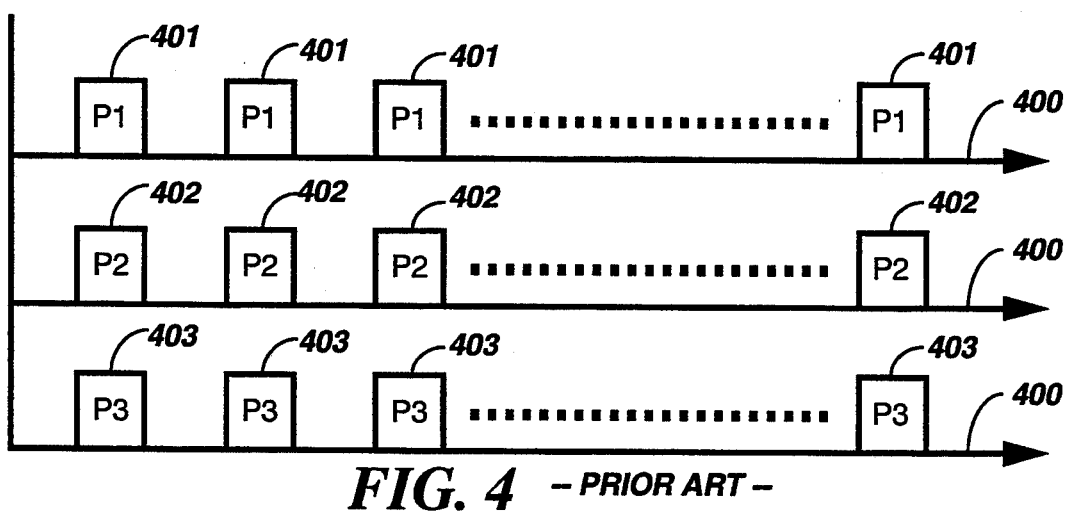
FIG. 4  – PRIOR ART –
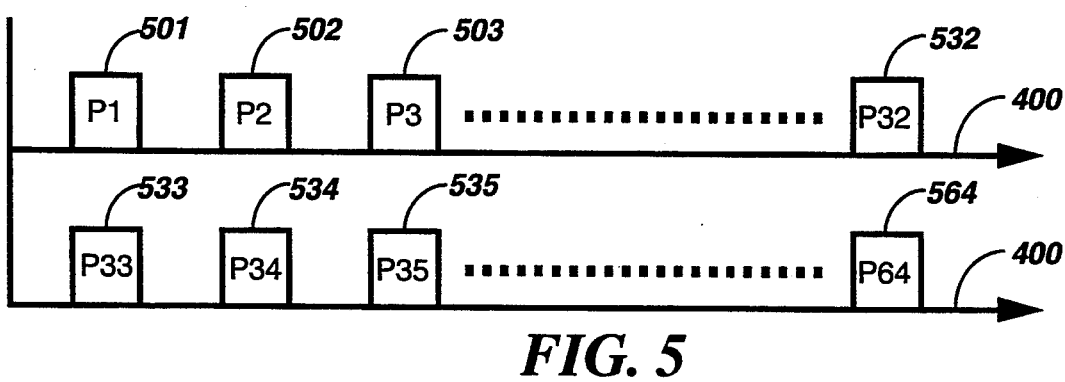
FIG. 5

METHOD AND APPARATUS FOR COMPLETING INBOUND CALLS IN A WIRELESS COMMUNICATION SYSTEM

FIELD OF THE INVENTION

This invention relates in general to wireless communication systems, and more specifically to two-way radio communication systems interconnected with a telephone system for providing inbound calls.

BACKGROUND OF THE INVENTION

Two-way wireless communication systems that support inbound calling from the public switched telephone network are well known in the art. Examples of such systems include cellular telephone systems and trunked radio systems. Also becoming well known are city-wide telepoint systems based on second generation cordless telephony (CT2) technology. This latter technology provides service within small, isolated "islands of coverage" each defined by a limited radio coverage range provided by one or more fixed communication units located therein.

Unlike cellular telephone systems and trunked radio systems, CT2 city-wide telepoint systems typically have hundreds or even thousands of fixed communication units, each individually interconnected with the public switched telephone network. With so many fixed communication units the routing of calls inbound to portable communication units being carried about the islands of coverage becomes a problem, because the system must locate the fixed communication unit nearest a called portable communication unit at the time of each inbound call to connect the call.

It is possible to conceive of several methods that might be used for locating the fixed communication unit nearest a called portable communication unit at the time of an inbound call, but it is difficult to conceive of a method that is not accompanied by substantial drawbacks. For example, a user could execute a manual registration key sequence upon arrival at a destination to indicate that the system should forward inbound calls to the destination. Manual registration, however, is considered by many to be a bothersome process. Furthermore, manual registration is impractical for users while on the move.

Critics of manual registration perhaps would suggest that the portable communication unit could monitor some form of a station identification signal transmitted by the strongest fixed communication unit and (re)register automatically if the station identification changes to that of a different station. Unfortunately, automatic registration would shorten battery life in the portable unit because of the required frequent registration transmissions from the portable communication unit. Automatic registration also can place a high traffic load on a central portable communication unit location registry as users move about the hundreds or thousands of fixed communication units typically found in a city-wide CT2 system.

Critics of both manual and automatic registration would perhaps propose sending call set-up polls from every fixed communication unit in a system, but doing so in all but the smallest of conventional systems would badly overload the fixed communication units with polling traffic, thus usurping costly transceiver capacity that would be better used for user communications.

One method that has been proposed is to use a fast city-wide radio paging system for sending a page to a portable communication unit that includes an integral radio pager. After receiving a page the portable communication unit links with a nearby fixed communication unit and reports its presence. This method, while a workable solution where sufficient radio paging capacity is available, is not practical everywhere. Radio paging also is a relatively expensive solution.

Thus, what is needed is a method of locating a portable communication unit to complete an inbound call for the portable communication unit without the disadvantages that accompany conventional methods. A method is needed that does not require either bothersome manual registration by the user or power consuming frequent automatic registration by the portable communication unit. In addition, a method is needed that does not place a high traffic load on a central portable communication unit location registry. Furthermore, a method is needed that does not require a fast city-wide paging system and that does not overload the fixed communication units with polling traffic.

SUMMARY OF THE INVENTION

One aspect of the present invention is a method in a fixed communication unit for completing a plurality of inbound calls for a plurality of portable communication units in a wireless communication system. The wireless communication system comprises a plurality of portable communication units and a plurality of fixed communication units. The fixed communication unit provides wireless communications over a limited coverage area and provides coupling to a telephone system. The fixed communication unit has at least one wireless transceiver operating on a plurality of wireless transmission channels for carrying call set-up signaling in a first mode and user communications in a second mode. The wireless communication system further comprises a call processor for routing calls. The method comoprises the step of generating more than one sequence of periodic call set-up polls on at least one of the at least one wireless transceiver on at least one of the plurality of wireless transmission channels. The sequence commences at a starting time for polling a portable communication unit having an inbound call. The sequence coexists with other sequences of periodic call set-up polls being generated concurrently by the same at least one of the at least one wireless transceiver. The method further comprises the steps of monitoring periodically the at least one of the plurality of wireless transmission channels for a reply from a replying one of the plurality of portable communication units polled in the generating step, and establishing a user communications link with the replying one of the plurality of portable communication units on a wireless transmission channel receiving a reply, in response to receiving the reply. The method further comprises the step of terminating in response to receiving the reply on the wireless transmission channel from the replying one of the plurality of portable communication units the more than one sequence of periodic call set-up polls generated in the generating step on the wireless transmission channel receiving the reply, except for the sequence of periodic call set-up polls for the replying one of the plurality of portable communication units. In addition, the method comprises the step of restarting on another wireless transmission channel the generation of the more than one sequence of periodic call set-up polls, each sequence having a new starting time, for each of the plurality of portable communication units whose polls were terminated in the terminating step.

Another aspect of the present invention is a method in a fixed communication unit for completing a plurality of inbound calls for a plurality of portable communication units in a wireless communication system comprising a plurality of portable communication units and a plurality of fixed communication units. The fixed communication unit provides wireless communications over a limited coverage area and provides coupling to a telephone system. The fixed communication unit has at least one wireless transceiver operating on a plurality of wireless transmission channels for carrying call set-up signaling in a first mode and user communications in a second mode. The wireless communication system further comprises a call processor for routing calls. The method comprises the steps of receiving information from the call processor comprising identities of a plurality of portable communication units having inbound calls awaiting routing, and generating in response to the receiving step more than one sequence of periodic call set-up polls on at least one of the at least one wireless transceiver on at least one of the plurality of wireless transmission channels. The sequence commences at a starting time for polling a portable communication unit having an inbound call, and the sequence coexists with other sequences of periodic call set-up polls being generated concurrently by the same at least one of the at least one wireless transceiver. The method further comprises the steps of monitoring periodically the at least one of the plurality of wireless transmission channels for a reply from a replying one of the plurality of portable communication units polled in the generating step, and establishing a user communications link with the replying one of the plurality of portable communication units on a wireless transmission channel receiving a reply in response to receiving the reply. In addition, the method comprises the step of commanding the call processor, in response to the establishing step, to route an inbound call for the replying one of the plurality of portable communication units to a telephone port in the fixed communication unit associated with the replying one of the plurality of portable communication units.

Another aspect of the present invention is a fixed communication unit for completing a plurality of inbound calls for a plurality of portable communication units in a wireless communication system comprising a plurality of portable communication units and a plurality of fixed communication units. The fixed communication unit provides wireless communications over a limited coverage area and provides coupling to a telephone system. The fixed communication unit operates on a plurality of wireless transmission channels for carrying call set-up signaling in a first mode and user communications in a second mode. The wireless communication system further comprises a call processor for routing calls. The fixed communication unit comprises apparatus for completing the plurality of inbound calls for the plurality of portable communication units. The apparatus comprises a processor for controlling the fixed communication unit and for generating more than one sequence of periodic call set-up polls in response to the plurality of inbound calls, and a data communication element coupled to the processor for communicating with the call processor for receiving inbound call information and responding with routing instructions therefor. The apparatus further comprises a memory coupled to the processor for storing values corresponding to each of a plurality of possible polling time slots, the values comprising inbound call information received from the call processor and determined within the fixed communication unit. The inbound call information comprises a plurality of portable communication unit identification codes for uniquely identifying each of a plurality of portable communication units receiving inbound calls. The apparatus further comprises a transceiver coupled to the processor for generating the more than one sequence of periodic call set-up polls on at least one of the plurality of wireless transmission channels for the plurality of portable communication units having inbound calls, and for monitoring periodically the at least one of the plurality of wireless transmission channels for a reply from one of the plurality of portable communication units polled. In addition, the apparatus comprises a wireless call processor coupled to the transceiver for establishing a wireless transmission link with a replying portable communication unit on one of the plurality of wireless transmission channels for handling the inbound call.

BRIEF DESCRIPTION OF THE DRAWINGS

FIG. 3 is a block diagram of a conventional portable communication unit used in accordance with the preferred embodiment of the present invention.

FIG. 4 is a timing diagram for a polling cycle of a conventional fixed communication unit operating in accordance with a CT2 Common Air Interface standard.

FIG. 5 is a timing diagram for a polling cycle of the fixed communication unit in accordance with the preferred embodiment of the present invention.

DESCRIPTION OF A PREFERRED EMBODIMENT

Figure 1:
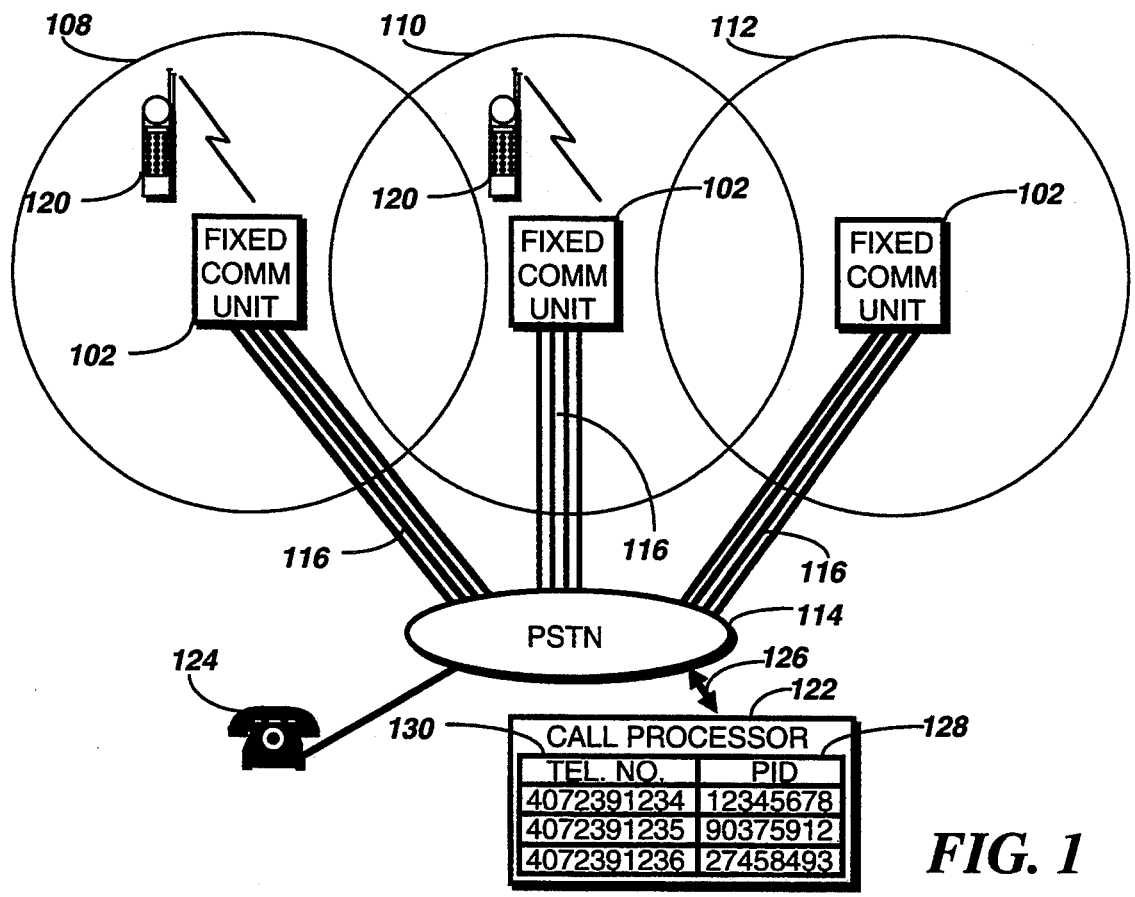
FIG. 1 is a block diagram of a wireless communication system in accordance with a preferred embodiment of the present invention.

With reference to FIG. 1, a block diagram of a wireless communication system in accordance with a preferred embodiment of the present invention comprises a plurality of fixed communication units 102 that provide radio coverage in a plurality of islands of coverage 108, 110, 112. The fixed communication units 102 are coupled to the Public Switched Telephone Network 114 by a plurality of telephone lines 116 comprising both voice and data channels. The wireless communication system according to the present invention can also be used with telephone systems other than the public switched telephone network, e.g., a private branch exchange.

The wireless communication system further comprises a plurality of conventional portable communication units 120 and at least one wired telephone set 124, both the portable communication unit 120 and the wired telephone set 124 being for sending and receiving calls between one another. A portable communication unit 120 may also communicate with another portable communication unit 120 through one or more of the fixed communication units 102.

Further enabling the wireless communication system for calls inbound to the portable communication units 120 is a call processor 122 for controlling the public switched telephone network 114 to perform call routing in a manner well known in the art. The call processor 122 is coupled to the plurality of fixed communication units 102 and to the public switched telephone network 114 by at least one data channel 126 for providing call routing data communications between the public switched telephone network 114 and the call processor 122, and between the plurality of fixed communication units 102 and the call processor 122. The call processor 122 comprises a database containing a plurality of values of telephone numbers 130 assigned to each of the plurality of portable communication units 120, the telephone numbers 130 being for receiving inbound calls from the public switched telephone network 114, and corresponding portable communication unit identification codes 128 assigned to each of the plurality of portable communication units 120.

Figure 2:
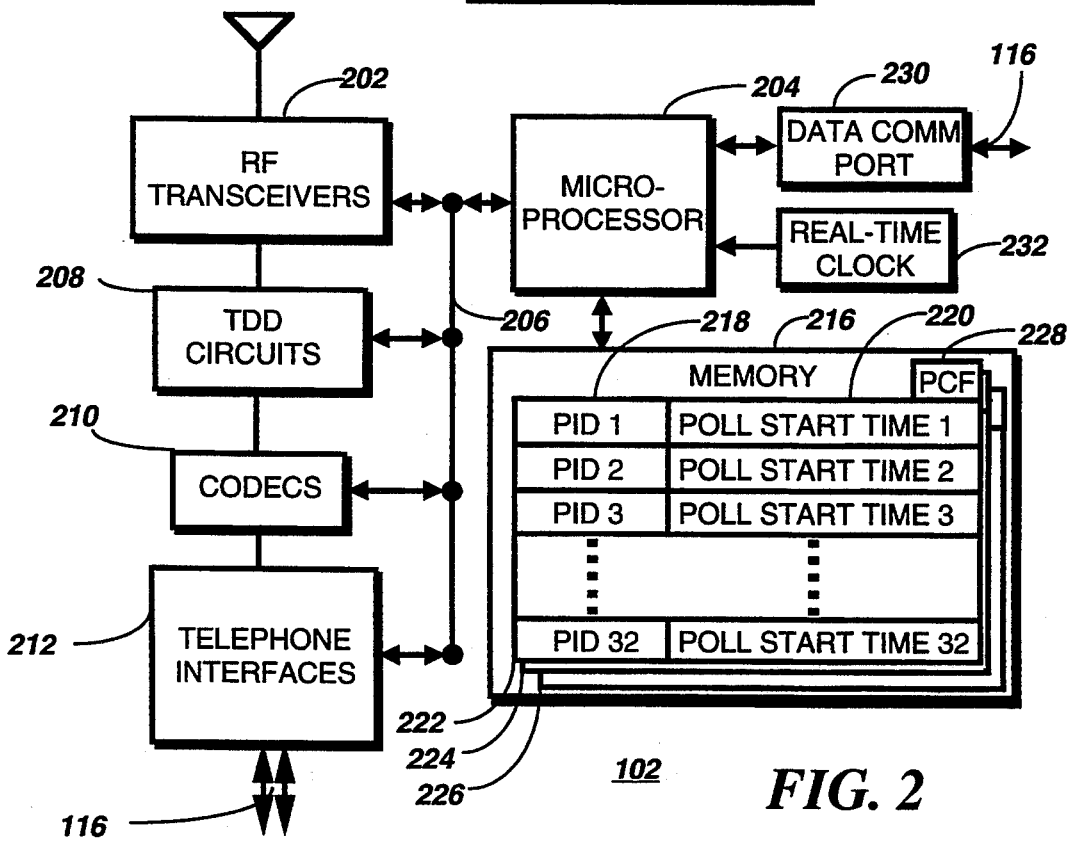
FIG. 2 is a block diagram of a fixed communication unit in accordance with the preferred embodiment of the present invention.

With reference to FIG. 2, a block diagram of the fixed communication unit 102 in accordance with the preferred embodiment of the present invention comprises a plurality of radio frequency (RF) transceivers 202 for transmitting and receiving radio signals comprising digital information transmitted and received in an frequency-division multiple-access and time-division duplex format. The plurality of RF transceivers 202 are coupled to a microprocessor 204 for controlling the plurality of RF transceivers 202 by a bus 206. The microprocessor 204 is coupled to a data communication port 230 for communicating with the call processor 122 (FIG. 1) through the public switched telephone network 114 by at least one of the plurality of telephone lines 116 in accordance with the present invention. The microprocessor 204 also is coupled to a real time clock 232 for providing real time values for timing operations in the fixed communication unit 102.

The plurality of radio frequency (RF) transceivers 202 are also coupled to a plurality of time-division duplex (TDD) circuits 208 for interfacing the plurality of RF transceivers 202 to a plurality of CODECs 210 for performing audio-to-digital and digital-to-audio conversions of signals transmitted and received, respectively, by the fixed communication unit 102. The plurality of CODECs 210 are coupled to a plurality of telephone interfaces 212 for coupling a portion of the plurality of telephone lines 116 to signals comprising voice communications from the plurality of CODECs 210. It is also possible in certain telephone systems, e.g., an Integrated Services Digital Network system, to carry both the data from the data communication port 230 and the signals comprising voice communications from the plurality of telephone interfaces 212 on the same telephone line 116.

The plurality of time-division duplex circuits 208, the plurality of CODECs 210, and the plurality of telephone interfaces 212 also are all coupled to the bus 206 for providing control by the microprocessor 204. A memory 216 is also coupled to the microprocessor for storing program control software and for storing values in a plurality of queue memory pages 222, 224, 226, each corresponding to one of the plurality of RF transceivers 202. Each of the plurality of queue memory pages 222, 224, 226 contains a plurality of memory location pairs 218, 220 reserved for values representing portable communication unit identification codes (PIDs) and corresponding poll start times. The two corresponding values in each of the plurality of memory location pairs 218, 220 are associated with a corresponding one of a plurality of poll time slots used by the one of the plurality of RF transceivers 202 corresponding to each of the plurality of queue memory pages 222, 224, 226, in accordance with the present invention as described further herein below. Each of the plurality of queue memory pages 222, 224, 226 also contains a location for a "polling channel flag" (PCF) 228 for indicating that the corresponding one of the plurality of RF transceivers 202 is currently designated to be a polling channel transceiver.

The microprocessor 204 comprises a memory access element 240 for accessing the memory 216 to check each of the plurality of poll start time values prior to generation of a sequence of periodic call set-up polls;

The microprocessor 204 further comprises a first processor element 242 coupled to the memory access element 240 for continuing the sequence of periodic call set-up polls for one of the plurality of portable communication units 120 in response to determining that the poll start time value corresponding to the portable communication unit 120 is greater than a value calculated from the current time value of the real-time clock 232 minus a pre-determined value.

The microprocessor 204 also includes a second processor element 244 coupled to the memory access element 240 for ending the sequence of periodic call set-up polls for one of the plurality of portable communication units 120 in response to determining that the poll start time value corresponding to the portable communication unit 120 is less than or equal to the value calculated from the current time value of the real-time clock 232 minus the predetermined value.

The microprocessor 204 further comprises a third processor element 246 for terminating the sequence of periodic call set-up polls for each of a plurality of portable communication units 120 being polled on at least one of a plurality of wireless transmission channels, except for the sequence of periodic call set-up polls for a replying portable communication unit 120, in response to receiving a reply from the replying portable communication unit 120 on one of the plurality of wireless transmission channels.

In addition, the microprocessor 204 includes a fourth processor element 248 coupled to the third processor element 246 for restarting from the beginning on another transmission channel the generation of the sequence of periodic call set-up polls for each of the plurality of portable communication units 120 whose call set-up polls are terminated by the third processor element.

With reference to FIG. 3, a block diagram of the conventional portable communication unit 120 used in accordance with the preferred embodiment of the present invention comprises an RF transceiver 302 for transmitting and receiving radio signals comprising digital information transmitted and received in an frequency-division multiple-access and time-division duplex format. The RF transceiver 302 is coupled to a microprocessor 304 for controlling the RF transceiver 302 by a bus 306. The RF transceiver 302 is also coupled to a time-division duplex circuit 308 for interfacing the RF transceiver 302 to a CODEC 310 for performing audio-to-digital and digital-to-audio conversions of signals transmitted and received, respectively, by the portable communication unit 120. The CODEC 310 is coupled to audio interfaces 312 for sending and receiving audio signals to and from a user of the portable communication unit 120. The time-division duplex circuit 308, the CODEC 310, and the audio interfaces 312 also are all coupled to the bus 306 for providing control by the microprocessor 304. A memory 318 is also coupled to the microprocessor 304 for storing program control software. Also coupled to the microprocessor 304 are a display 314 for displaying information sent from the microprocessor 304 and a keyboard 316 for receiving control input from the user.

A document entitled "CT2 Common Air Interface," Version: 1.1, published Jun. 30, 1991, by the European Telecommunications Standards Institute, describes a common communication protocol hereinafter referred to as "the CT2 Common Air Interface standard". The protocol used in the wireless communication system according to the present invention operates substantially in accordance with the requirements of the CT2 Common Air Interface standard. Other wireless communication systems based on other standards may also benefit from the present invention.

The CT2 Common Air Interface standard allows a fixed communication unit to poll for a pre-programmed group up to thirty-two portable communication unit identification codes on a single channel in response to a single inbound call. This "group calling" capability is provided to allow a single privately owned, e.g., residential, fixed communication unit to cause a pre-programmed group of portable communication units each to generate an alert at the start of an inbound call. The first portable communication unit to answer its alert is then connected to the call.

With reference to FIG. 4, a timing diagram for a polling cycle of a conventional fixed communication unit operating in accordance with the CT2 Common Air Interface standard shows three polls 401, 402, 403 being sent repeatedly in time, time being represented by a horizontal axis 400 for each transceiver sending the polls. Because a conventional fixed communication unit is incapable of polling simultaneously for multiple portable communication unit identification codes in response to multiple inbound calls, sending the three polls 401, 402, 403 requires three RF transceivers operating on three different radio frequencies, as depicted by the three horizontal axes 400. Because the CT2 Common Air Interface standard requires an unanswered poll from an fixed communication unit to last for a minimum of 1.4 seconds, polling capacity using conventional fixed communication units is limited.

For example, calculations based on inbound call traffic estimates indicate that approximately 5,000 portable communication unit users will use a mean capacity equal to the total available air time of one transceiver in every fixed communication unit in a conventional wireless communication system to perform the required polling for inbound calls. Being limited to 5,000 portable communication unit users per polling transceiver at each island of coverage 108, 110, 112 (FIG. 1) is not practical in large metropolitan systems, which may have 100,000 or more portable communication unit users but only a few transceivers in each island of coverage 108, 110, 112.

The preferred embodiment of the present invention adds another dimension to the group calling capability described by the CT2 Common Air Interface standard. The additional dimension comprises a multi-polling method by which the fixed communication unit 102 (FIGS. 1, 2) polls for up to thirty-two dynamically assigned portable communication unit identification codes on each available channel, in response to receiving routing requests for up to thirty-two separate and unrelated inbound calls from the call processor 122 (FIG. 1). The fixed communication unit 102 in accordance with the present invention keeps track of the relationship between, and timing of, each inbound call and a corresponding one of the up to thirty-two portable communication unit identification codes polled.

It is possible to poll for a plurality of portable communication units 120 (FIGS. 1, 3) simultaneously on a single channel because the probability that any one fixed communication unit 102 (FIGS. 1, 2) will link with a called portable communication unit 120 is typically very small. While polling for multiple portable communication units 120, most of the fixed communication units 102 will not receive a response from any of the polled portable communication units 120. A few fixed communication units 102 will receive one response. Some fixed communication units 102 may receive multiple responses, and must steer all but the first responding portable communication unit 120 to another channel.

According to the present invention, because the inbound calls arrive at random times, the fixed communication unit 102 (FIGS. 1, 2) handles the duration of each poll independently in accordance with the timing requirements of the CT2 Common Air Interface standard, without regard to the timing of other simultaneous polls on the channel. The one exception to the independent handling of poll duration is that if a first responding portable communication unit 120 (FIGS. 1, 3) responds to its poll, the fixed communication unit 102 establishes a radio link with the first responding portable communication unit 120 on the wireless transmission channel being used for the polls. The fixed communication unit 102 then moves the polls for all the remaining called portable communication units 120 to a different wireless transmission channel while reinitializing the poll duration timers for all the moved polls.

With reference to FIG. 5, a timing diagram for a polling cycle of the fixed communication unit 102 (FIGS. 1, 2) in accordance with the preferred embodiment of the present invention shows a first plurality of up to thirty-two polls being sent from a first RF transceiver 202 (FIG. 2) in sequential poll time slots 501, 502, 503, 532 during a polling cycle. Also shown is a second plurality of up to thirty-two additional polls being sent from a second RF transceiver 202 in sequential poll time slots 533, 534, 535, 564. Because the CT2 Common Air Interface standard allows up to thirty-two different polls to be sent in a polling cycle from a single RF transceiver 202, and because the fixed communication unit 102 in accordance with the present invention is capable of tracking the polling simultaneously for multiple portable communication unit identification codes in response to multiple inbound calls unrelated to one another, the polling capacity of the wireless communication system according to the present invention is increased by a factor of thirty-two over that of a conventional CT2 wireless communication system. The factor of thirty-two improvement in polling capacity provided by the present invention advantageously allows ubiquitous call set-up polling to become practical, even for city-wide CT2 systems.

Each of the thirty-two poll time slots 501, 502, 503, 532 corresponds to one of the thirty-two memory location pairs 218, 220 (FIG. 2) in the queue memory page 222, 224, 226 (FIG. 2) corresponding to the first RF transceiver 202, values in the thirty-two memory pairs 218, 220 being for controlling the polling of the first RF transceiver 202 according to the present invention. Each of the thirty-two poll time slots 533, 534, 535, 564 corresponds to one of the thirty-two memory location pairs 218, 220 in the queue memory page 222, 224, 226 corresponding to the second RF transceiver 202, values in the thirty-two memory pairs 218, 220 being for controlling the polling of the second RF transceiver 202 according to the present invention.

Using the inbound traffic estimates of the previous example, one transceiver in every fixed communication unit 102 (FIGS. 1, 2) according to the present invention, used fully for polling for inbound calls, will support approximately 160,000 portable communication unit users. This number of portable communication unit users is a much more practical number for large metropolitan systems than the 5,000 user limit of the conventional fixed communication unit discussed herein earlier.

Advantageously, in all but the largest of systems the present invention makes it practical to eliminate the requirement for location registration to reduce polling traffic. In extremely large systems that exceed a level of polling traffic considered practical without location registration, the present invention makes it possible to divide the system into only a few, e.g., less than ten, different registration zones, thus eliminating the requirement for the portable communication unit 120 (FIGS. 1, 3) to register its location frequently. By minimizing the occurrence of location registrations caused by movement of the portable communication unit, the deleterious effects on portable communication unit battery life and high location registry traffic in conventional systems that use automatic location registration are both eliminated.

Figure 6:
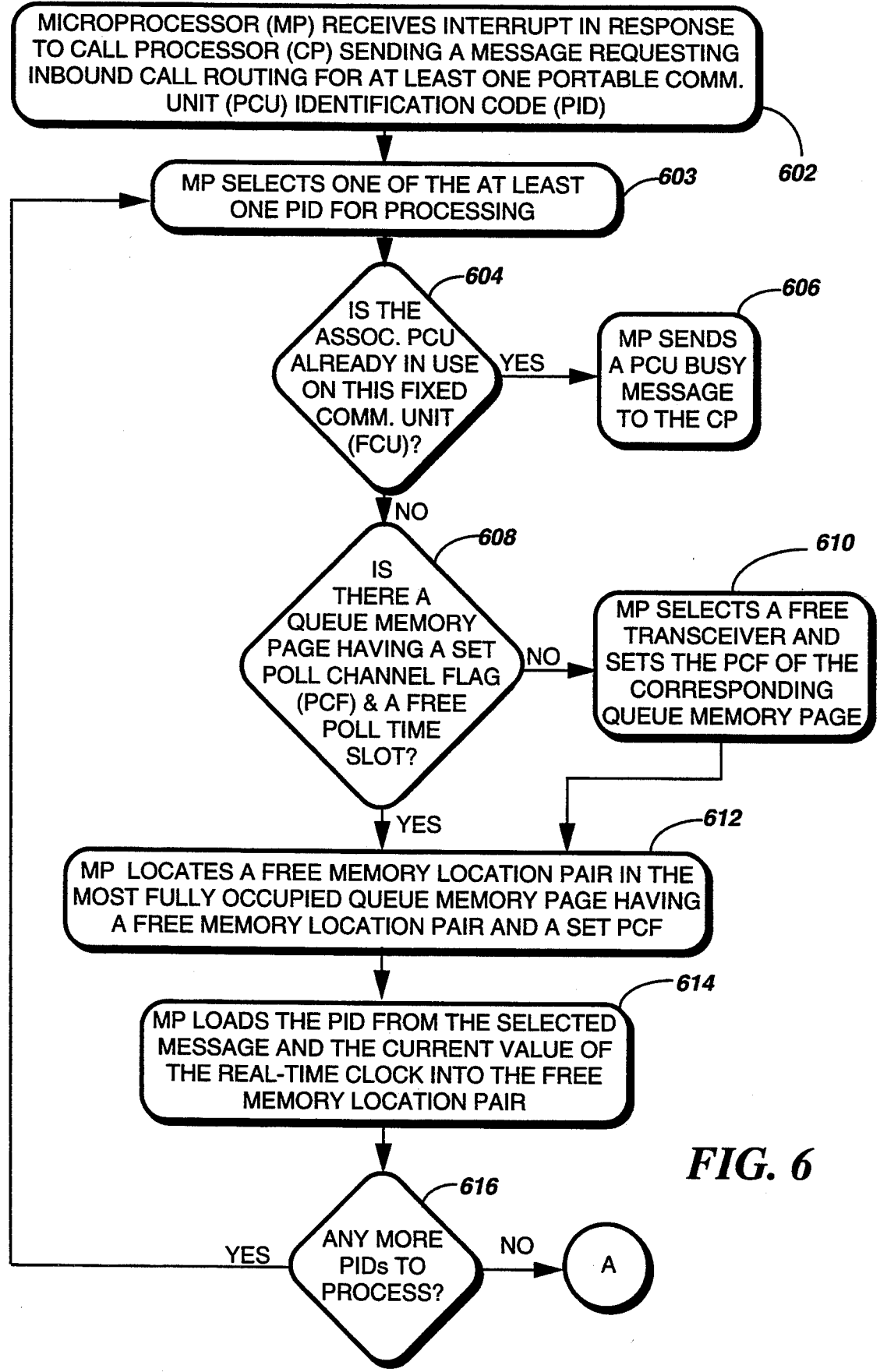
FIG. 6 is a flow chart of the operation of the fixed communication unit in response to receiving at least one inbound call routing request from a call processor in accordance with the preferred embodiment of the present invention.

With reference to FIG. 6, a flow chart shows the operation of the fixed communication unit 102 (FIGS. 1, 2) in response to receiving at least one inbound call routing request from a call processor in accordance with the preferred embodiment of the present invention. The operation comprises the microprocessor 204 (FIG. 2) receiving 602 an interrupt from the data communication port 230 (FIG. 2) in response to a message sent from the call processor 122 requesting inbound call routing for at least one portable communication unit 120 (FIGS. 1, 3) identified by at least one portable communication unit identification code. In response, the microprocessor 204 selects 603 one of the at least one portable communication unit identification code for processing. Next, the microprocessor 204 determines 604 whether the portable communication unit 120 associated with the code is already in use on another call being handled by the fixed communication unit 102. If so, the microprocessor 204 sends 606 a response to the call processor 122 indicating that the portable communication unit 120 is busy.

If, on the other hand, the microprocessor 204 (FIG. 2) determines in step 604 that the portable communication unit 120 is not in use on the fixed communication unit 102, then the microprocessor 204 accesses the memory 216 (FIG. 2). The purpose of accessing the memory 216 is to determine 608 whether there is a queue memory page 222, 224, 226 (FIG. 2) having a set polling channel flag 228 (FIG. 2) and having a free (unused) memory location pair 218, 220 corresponding to a free poll time slot 501, 502, 503, 532, 533, 534, 535, 564. If in step 608 the microprocessor 204 determines there to be no free memory location pair 218, 220 in a queue memory page 222, 224, 226 having a set polling channel flag 228, then the microprocessor 204 selects 610 a free RF transceiver 202 (FIG. 2) and sets the polling channel flag 228 of the queue memory page 222, 224, 226 corresponding to the selected RF transceiver 202.

Next, the microprocessor 204 (FIG. 2) locates 612 a free memory location pair 218, 220 in the most fully occupied queue memory page 222, 224, 226 (FIG. 2) that has a free memory location pair 218, 220 and a set polling channel flag 228. The reason for selecting the most fully occupied available queue memory page is to concentrate as many polls as possible into the smallest number (preferably one) of RF transceivers 202 (FIG. 2), such that as many of the RF transceivers 202 as possible remain free to carry user communications instead of being used for polling.

Because the number of RF transceivers 202 required for polling changes dynamically from moment to moment, an additional RF transceiver 202 may sometimes have to be used temporarily to handle polling when required by a peak in the polling traffic. Still, it is desirable to return the additional RF transceiver 202 to normal user communications handling soon after the polling traffic returns to a normal level. The return to normal user communications handling will happen automatically after a short time if the microprocessor 204 always attempts to use the most fully occupied one of the queue memory pages 222, 224, 226 having a free memory location pair and a set polling channel flag 228 (FIG. 2).

After locating 612 a free memory location pair 218, 220, the microprocessor 204 (FIG. 2) loads 614 the portable communication unit identification code associated with the message selected in step 603 and a current value of the real time clock 232 (FIG. 2) into the free memory location pair 218, 220. Next, the microprocessor 204 checks 616 whether there are any more portable communication unit identification codes to process. If so, the microprocessor 204 returns to step 603. If not, the microprocessor 204 goes on to step 702 (FIG. 7).

Figure 7:
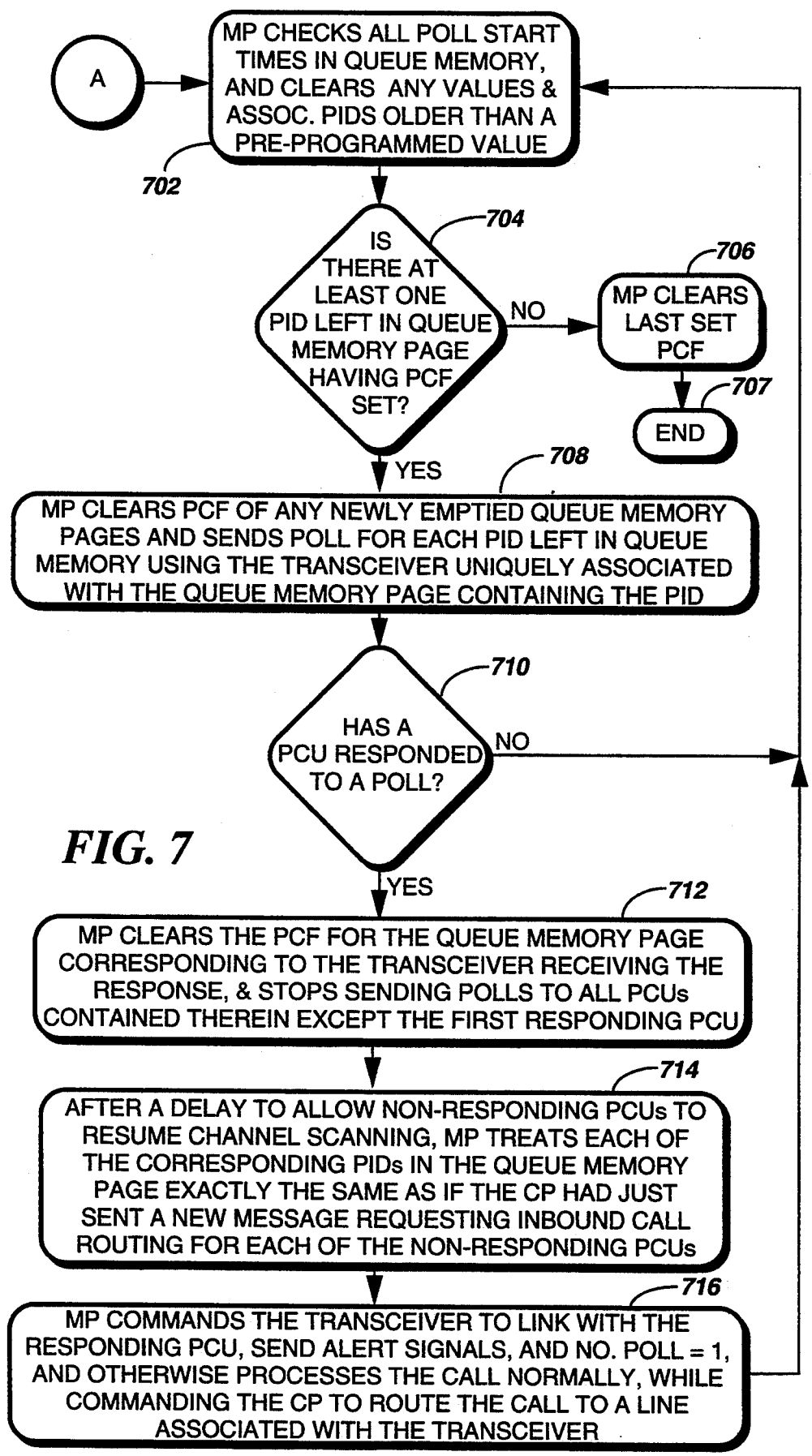
FIG. 7 is a flow chart of the operation of the fixed communication unit while polling for at least one portable communication unit identification code in response to at least one inbound call in accordance with the preferred embodiment of the present invention.

With reference to FIG. 7, a flow chart of the operation of the fixed communication unit 102 (FIGS. 1, 2) while polling for at least one portable communication unit identification code in response to at least one inbound call in accordance with the preferred embodiment of the present invention comprises the microprocessor's 204 (FIG. 2) checking 702 all poll start times in the queue memory pages 222, 224, 226. After checking the poll start times, the microprocessor 204 clears any memory location pairs 218, 220 containing a poll start time value less than a current value of the real-time clock 232 (FIG. 2), minus a pre-programmed value. Next, the microprocessor 204 determines 704 whether there is at least one portable communication unit identification code left in any of the queue memory pages 222, 224, 226 having the polling channel flag 228 set. If not, the microprocessor 204 clears 706 the last set polling channel flag 228 and ends 707 the process, as there currently is no portable communication unit identification code requiring further polling.

If, on the other hand, there is at least one portable communication unit identification code left, then the microprocessor 204 (FIG. 2) clears 708 the polling channel flag 228 of any newly emptied queue memory pages 222, 224, 226 that were created by step 702. Then the microprocessor sends a poll for each portable communication unit identification code left in queue memory, using the RF transceiver 202 corresponding to the queue memory page 222, 224, 226 containing the portable communication unit identification code, and using the associated one of the thirty-two poll time slots 501, 502, 503, 532, or 533, 534, 535, 564 corresponding to the memory location pair 218, 220 (FIG. 2) therein containing the portable communication unit identification code. In step 710 the microprocessor 204 monitors for a response, without which the microprocessor 204 returns to step 702 and continues from there.

If, in step 710, the microprocessor 204 (FIG. 2) is informed by a time-division duplex circuit 208 (FIG. 2) that the time-division duplex circuit 208 has detected a response from a responding portable communication unit 120 (FIGS. 1, 3), then the microprocessor 204 clears 712 the polling channel flag 228 (FIG. 2) of the queue memory page 222, 224, 226 (FIG. 2) corresponding to the RF transceiver 202 receiving the response, and stops sending polls to all the portable communication units 120 contained in the queue memory page 222, 224, 226, except for the responding portable communication unit 120.

After a delay to allow the non-responding portable communication units to resume channel scanning, the microprocessor 204 (FIG. 2) treats 714 each of the remaining portable communication unit identification codes in the queue memory page 222, 224, 226 (FIG. 2) exactly as if the microprocessor 204 had just received 602 (FIG. 6) an interrupt from the data communication port 230 (FIG. 2) in response to a message sent from the call processor 122 (FIG. 1) requesting inbound call routing for each of the remaining corresponding portable communication units. That is, the remaining portable communication unit identification codes are reprocessed from the beginning of the flow chart of FIG. 6 as if the remaining portable communication unit identification codes were new arrivals.

Finally, the microprocessor 204 (FIG. 2) directs the RF transceiver 202 (FIG. 2) having received the response to link 716 with the responding portable communication unit 120 (FIGS. 1, 3). Simultaneously, the microprocessor 204 directs the data communication port 230 (FIG. 2) to command the call processor 122 (FIG. 1) to control the public switched telephone network 114 to route the call intended for the responding portable communication unit 120 to one of the plurality of telephone lines 116 (FIG. 1) associated with the RF transceiver 202 having received the response. From this point, the microprocessor 204 sends alert signals to the responding portable communication unit 120, informs the responding portable communication unit 120 that the poll is for only a single portable communication unit 120, and otherwise continues to process the call normally according to the CT2 Common Air Interface standard, while resuming the previously described polling process for other portable communication units 120 at step 702.

In telepoint systems that have a large number of fixed communication units 102 (FIGS. 1, 2) it is possible that a plurality of the fixed communication units 102 will independently select the same RF transmission channel for sending call set-up polls. If the plurality of fixed communication units 102 happen to be located close to one another, the polls received by portable communication units 120 (FIGS. 1, 3) that are in range of two or more of the plurality of fixed communication units 102 may "collide," i.e., be mixed in a manner that may make the polls unreceivable. It is also possible that a fixed communication unit 102 may select a polling channel that collides with user communications on another nearby fixed communication unit 102. In either of these cases, polling reliability can be improved by sending each poll on more than a single polling channel. This multi-channel polling can be done sequentially using one channel at a time, or concurrently using several channels at once.

Figure 8:
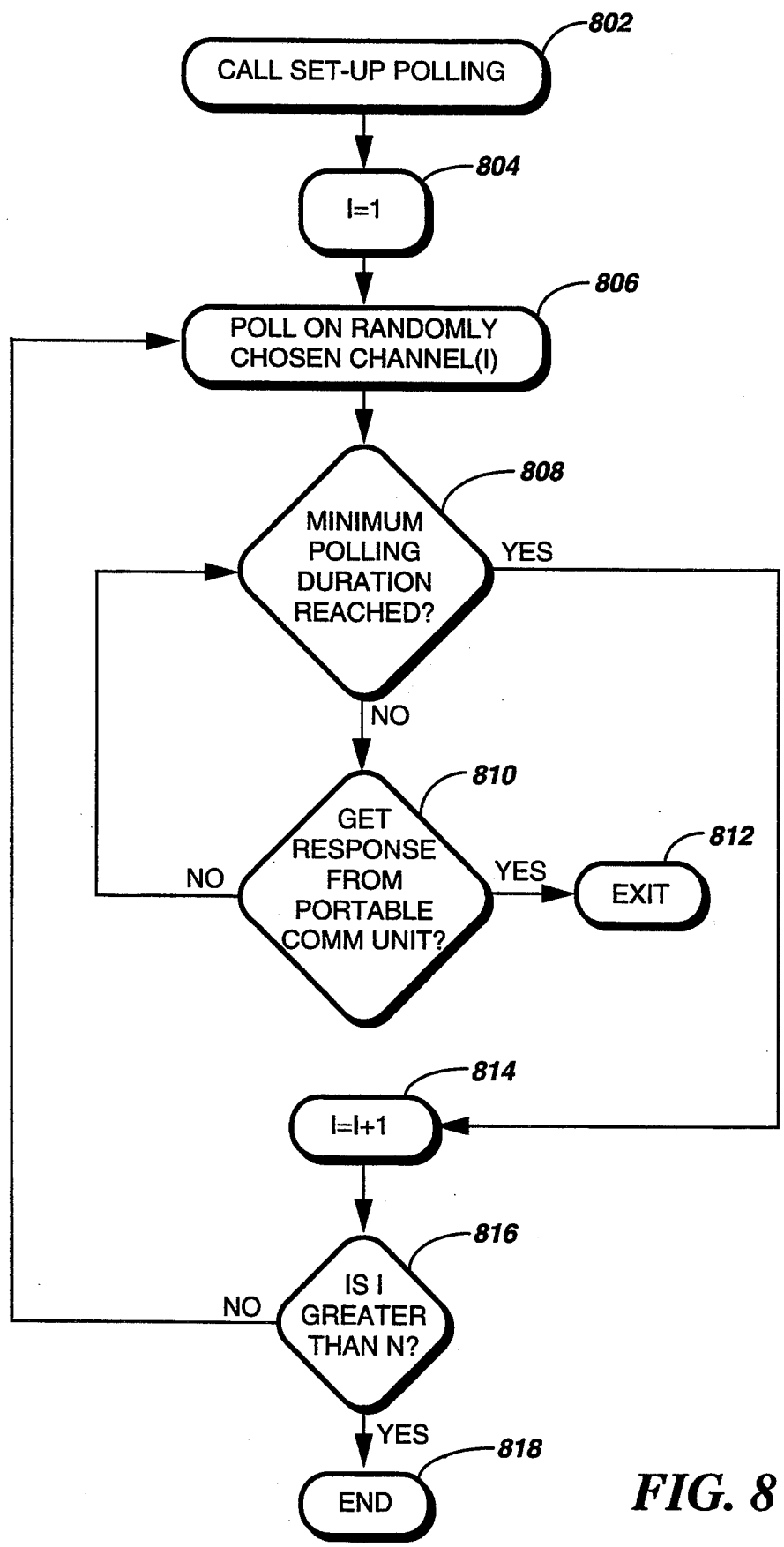
FIG. 8 is a flow chart of an alternate method of polling to minimize poll collmsions in accordance with the preferred embodiment of the present invention.

With reference to FIG. 8, an alternate method of polling to minimize poll collisions in accordance with the preferred embodiment of the present invention is depicted. When a call set-up polling process begins 802, the microprocessor 204 (FIG. 2) sets 804 a polling control variable I to a value of unity. Next, the microprocessor 204 commands 806 a time-division duplex circuit 208 (FIG. 2) and an RF transceiver 202 (FIG. 2) to begin polling on a randomly chosen channel. If in step 808 a predetermined minimum polling duration has not been reached, the microprocessor 204 continues the polling while checking 810 for a response from a portable communication unit 120 (FIGS. 1, 3). If in step 810 a response is obtained, the microprocessor 204 exits from the polling sequence to process the response. On the other hand, if no response is obtained in step 810, the microprocessor 204 continues the polling until the minimum polling duration is reached. When in step 808 the minimum polling duration is reached, the microprocessor 204 increments 814 the polling control variable I and then checks 816 to see if the maximum predetermined number N of channels have been polled. If not, the microprocessor 204 returns to step 806 and restarts polling on a new randomly chosen channel. If, on the other hand, in step 816 the microprocessor 204 determines that the maximum predetermined number N of channels have been polled, then the microprocessor 204 ends 818 the polling process.

For example, each poll could be sent for some predetermined minimum duration on channel "A," followed by the same minimum duration on channel "B," followed by the same minimum duration on channel "C," wherein the three channels A, B, and C are selected by a random process in each of the plurality of fixed communication units 102. In this manner the probability of poll collisions can be minimized.

Thus, the present invention provides a method of locating a portable communication unit 120 (FIGS. 1, 3) to complete an inbound call for the portable communication unit 120 without the disadvantages that accompany conventional methods. The present invention does not require either bothersome manual registration by the user or power consuming frequent automatic registration by the portable communication unit 120. While automatic registration may be needed in some very large systems, the present invention reduces the number of required registration zones, and thus the frequency of location registrations, to a level small enough to prevent high power consumption and resultant short battery life. For the same reason, the present invention prevents a high traffic load on the central portable communication unit location registry of the very large systems that may need automatic registration. Advantageously, the present invention does not require a fast (and expensive) city-wide paging system. Also, the present invention does not overload the fixed communication units 102 (FIGS. 1, 2) with polling traffic, but can easily meet polling traffic requirements while using only a single polling channel in all but the largest of systems.

The present invention provides an economical, efficient method and apparatus for completing inbound calls to portable communication units 120 without the drawbacks that accompany other possible inbound calling schemes. While the present invention is particularly suitable for CT2 applications, other types of communication applications may also benefit from its use.

We claim:

1. A method in a fixed communication unit for completing a plurality of inbound calls for a plurality of portable communication units in a wireless communication system comprising a plurality of portable communication units and a plurality of fixed communication units, the fixed communication unit for providing wireless communications over a limited coverage area and for providing coupling to a telephone system and having at least one wireless transceiver operating on a plurality of wireless transmission channels for carrying call set-up signaling in a first mode and user communications in a second mode, the wireless communication system further comprising a call processor for routing calls, the method comprising the steps of:

generating more than one sequence of periodic call set-up polls on at least one of the at least one wireless transceiver on at least one of the plurality of wireless transmission channels, the sequence commencing at a starting time for polling a portable communication unit having an inbound call, wherein the sequence coexists with other sequences of periodic call set-up polls being generated concurrently by the same at least one of the at least one wireless transceiver;

monitoring periodically the at least one of the plurality of wireless transmission channels for a reply from a replying one of the plurality of portable communication units polled in the generating step;

establishing a user communications link with the replying one of the plurality of portable communication units on a wireless transmission channel receiving a reply, in response to receiving the reply;

terminating in response to receiving the reply on the wireless transmission channel from the replying one of the plurality of portable communication units the more than one sequence of periodic call set-up polls generated in the generating step on the wireless transmission channel receiving the reply, except for the sequence of periodic call set-up polls for the replying one of the plurality of portable communication units; and restarting on another wireless transmission channel the generation of the more than one sequence of periodic call set-up polls, each sequence having a new starting time, for each of the plurality of portable communication units whose polls were terminated in the terminating step.

2. The method according to claim 1, further comprising the steps of:

receiving information from the call processor comprising identities of a plurality of portable communication units having inbound calls awaiting routing; and commanding the call processor, in response to receiving the reply to one of the periodic call set-up polls from the replying one of the plurality of portable communication units, to route an inbound call for the replying one of the plurality of portable communication units to a telephone port in the fixed communication unit associated with the replying one of the plurality of portable communication units.

3. The method according to claim 2, further comprising the step of:

informing the call processor that one of the plurality of portable communication units having inbound calls awaiting routing is busy in response to the receiving step if the fixed communication unit determines that the one of the plurality of portable communication units is in use on another call being handled by the fixed communication unit.

4. The method according to claim 1, further comprising the steps of:

maintaining a plurality of poll start time values, corresponding to each of a plurality of portable communication units having inbound calls awaiting routing, the polls tart time value for recording the most recent starting time of the sequence of periodic call set-up polls for each of the plurality of portable communication units having polls generated in the generating step or restarted in the restarting step;

comparing prior to the generation of a sequence of periodic call set-up polls in the generating and restarting steps the poll start time value of the poll with the current time;

continuing in response to the comparing step the sequence of periodic call set-up polls for each of the plurality of portable communication units determined to have a poll start time value greater than the current time minus a pre-determined value; and ending in response to the comparing step the sequence of periodic call set-up polls for each of the plurality of portable communication units determined to have a poll start time value less than or equal to the current time minus the pre-determined value.

5. The method according to claim 1, further comprising the step of:

delaying the execution of the restarting step in order to allow the plurality of portable communication units whose sequences of periodic call set-up polls were terminated in the terminating step sufficient time to resume channel scanning.

6. A method in fixed communication unit for completing a plurality of inbound calls for a plurality of portable communication units in a wireless communication system comprising a plurality of portable communication units and a plurality of fixed communication units, the fixed communication unit for providing wireless communications over a limited coverage area and for providing coupling to a telephone system and having at least one wireless transceiver operating on a plurality of wireless transmission channels for carrying call set-up signaling in a first mode and user communications in a second mode, the wireless communication system further comprising a call processor for routing calls, the method comprising the steps of:

receiving information from the call processor comprising identities of a plurality of portable communication units having inbound calls awaiting routing;

generating in response to the receiving step more than one sequence of periodic call set-up polls on at least one of the at least one wireless transceiver on at least one of the plurality of wireless transmission channels, the sequence commencing at a starting time for polling a portable communication unit having an inbound call, wherein the sequence coexists with other sequences of periodic call set-up polls being generated concurrently by the same at least one of the at least one wireless transceiver;

monitoring periodically the at least one of the plurality of wireless transmission channels for a reply from a replying one of the plurality of portable communication units polled in the generating step;

establishing a user communications link with the replying one of the plurality of portable communication units on a wireless transmission channel receiving a reply in response to receiving the reply; and commanding the call processor, in response to the establishing step, to route an inbound call for the replying one of the plurality of portable communication units to a telephone port in the fixed communication unit associated with the replying one of the plurality of portable communication units.

7. The method according to claim 6, further comprising the steps of:

terminating, in response to receiving a reply on a wireless transmission channel from a replying one of the plurality of portable communication units, the more than one sequence of periodic call set-up polls generated in the generating step on the wireless transmission channel receiving the reply, except for the sequence of periodic call set-up polls for the replying one of the plurality of portable communication units; and restarting on another wireless transmission channel the generation of the more than one sequence of periodic call set-up polls, each sequence having a new starting time, for each of the plurality of portable communication units whose polls were terminated in the terminating step.

8. The method according to claim 6, further comprising the step of:

informing the call processor that one of the plurality of portable communication units having inbound calls awaiting routing is busy in response to the receiving step if the fixed communication unit determines that the one of the plurality of portable communication units is in use on another call being handled by the fixed communication unit.

9. The method according to claim 7, further comprising the steps of:

maintaining a plurality of poll start time values, corresponding to each of a plurality of portable communication units having inbound calls awaiting routing, the poll start time value for recording the most recent starting time of the sequence of periodic call set-up polls for each of the plurality portable communication units having polls generated in the generating step or restarted in the restarting step;

comparing prior to the generation of a sequence of periodic call set-up polls in the generating and restarting steps the poll start time value of the poll with the current time;

continuing in response to the comparing step the sequence of periodic call set-up polls for each of the plurality of portable communication units determined to have a poll start time value greater than the current time minus a pre-determined value; and ending in response to the comparing step the sequence of periodic call set-up polls for each of the plurality of portable communication units determined to have a poll start time value less than or equal to the current time minus the pre-determined value.

10. The method according to claim 7, further comprising the step of:

delaying the execution of the restarting step in order to allow the plurality of portable communication units whose sequences of periodic call set-up polls were terminated in the terminating step sufficient time to resume channel scanning.

11. A fixed communication unit for completing a plurality of inbound calls for a plurality of portable communication units in a wireless communication system comprising a plurality of portable communication units and a plurality of fixed communication units, the fixed communication unit for providing wireless communications over a limited coverage area and for providing coupling to a telephone system and operating on a plurality of wireless transmission channels for carrying call set-up signaling in a first mode and user communications in a second mode, the wireless communication system further comprising a call processor for routing calls, the fixed communication unit comprising apparatus for completing the plurality of inbound calls for the plurality of portable communication units, the apparatus comprising:

processor means for controlling the fixed communication unit and for generating more than one sequence of periodic call set-up polls in response to the plurality of inbound calls;

data communication means coupled to the processor means for communicating with the call processor for receiving inbound call information and responding with routing instructions therefor;

memory means coupled to the processor means for storing values corresponding to each of a plurality of possible polling time slots, the values comprising inbound call information received from the call processor and determined within the fixed communication unit, the inbound call information comprising a plurality of portable communication unit identification codes for uniquely identifying each of a plurality of portable communication units receiving inbound calls;

transceiver means coupled to the processor means for generating the more than one sequence of periodic call set-up polls on at least one of the plurality of wireless transmission channels for the plurality of portable communication units having inbound calls, and for monitoring periodically the at least one of the plurality of wireless transmission channels for a reply from one of the plurality of portable communication units polled; and wireless call processing means coupled to the transceiver means for establishing a wireless transmission link with a replying portable communication unit on one of the plurality of wireless transmission channels for handling the inbound call.

12. The fixed communication unit according to claim 11, further comprising a real-time clock having a time value for controlling polling duration, and wherein the inbound call information further comprises a corresponding plurality of poll start time values comprising the time value of the real-time clock at the start of the sequence of periodic call set-up polls of each of the plurality of portable communication units having inbound calls for timing the duration of each of the sequences of periodic call set-up polls, and wherein the processor means comprises:

memory access means for accessing the memory means to check each of the plurality of poll start time values prior to the generation of each of the sequences of periodic call set-up polls;

a first processor element coupled to the memory access means for continuing the sequence of periodic call set-up polls for one of the plurality of portable communication units in response to determining that the poll start time value corresponding to the portable communication unit is greater than a value calculated from the current time value of the real-time clock minus a pre-determined value; and a second processor element coupled to the memory access means for ending the sequence of periodic call set-up polls for one of the plurality of portable communication units in response to determining that the poll start time value corresponding to the portable communication unit is less than or equal to the value calculated from the current time value of the real-time clock minus the pre-determined value.

13. The fixed communication unit according to claim 11, wherein the processor means comprises:

a third processor element for terminating the sequence of periodic call set-up polls for each of a plurality of portable communication units being polled on the at least one of the plurality of wireless transmission channels, except for the sequence of periodic call set-up polls for a replying portable communication unit, in response to receiving a reply from the replying portable communication unit on one of the plurality of wireless transmission channels; and a fourth processor element coupled to the third processor element restarting from the beginning on another transmission channel the generation of the sequence of periodic call set-up polls for each of the plurality of portable communication units whose call set-up polls are terminated by the third processor element.

14. The fixed communication unit according to claim 11, further comprising:

a real-time clock having a time value for controlling polling duration, and wherein the inbound call information further comprises a corresponding plurality of poll start time values comprising the time value of the real-time clock at the start of the sequence of periodic call set-up polls of each of the plurality of portable communication units having inbound calls for timing the duration of each of the sequences of periodic call set-up polls, and wherein the processor means comprises:

memory access means for accessing the memory means to check each of the plurality of poll start time values prior to the generation of each of the sequences of periodic call set-up polls;

a first processor element coupled to the memory access means for continuing the sequence of periodic call set-up polls for one of the plurality of portable communication units in response to determining that the poll start time value corresponding to the portable communication unit is greater than a value calculated from the current time value of the real-time clock minus a pre-determined value;

a second processor element coupled to the memory access means for ending the sequence of periodic call set-up polls for one of the plurality of portable communication units in response to determining that the poll start time value corresponding to the portable communication unit is less than or equal to the value calculated from the current time value of the real-time clock minus the pre-determined value;

a third processor element for terminating the sequence of periodic call set-up polls for each of a plurality of portable communication units being polled on one of the plurality of wireless transmission channels, except for a replying portable communication unit, in response to receiving a reply from the replying portable communication unit on one of the plurality of wireless transmission channels; and a fourth processor element coupled to the third processor element for restarting from the beginning on another transmission channel the generation of the sequence of periodic call set-up polls for each of the plurality of portable communication units whose call set-up polls are terminated by the third processor element.

15. A fixed communication unit for completing a plurality of inbound calls for a plurality of portable communication units in a wireless communication system comprising a plurality of portable communication units and a plurality of fixed communication units, the fixed communication unit for providing wireless communications over a limited coverage area and for providing coupling to a telephone system and operating on a plurality of wireless transmission channels for carrying call set-up signaling in a first mode and user communications in a second mode, the wireless communication system further comprising a call processor for routing calls, the fixed communication unit comprising apparatus for completing the plurality of inbound calls for the plurality of portable communication units, the apparatus comprising:

a microprocessor for controlling the fixed communication unit and for generating more than one sequence of periodic call set-up polls in response to the plurality of inbound calls;

data communication ports coupled to the microprocessor for communicating with the call processor for receiving inbound call information and responding with routing instructions therefor;

a real-time clock coupled to the microprocessor and having a time value for controlling polling duration; and a memory coupled to the microprocessor for storing values corresponding to each of a plurality of possible polling time slots, the values comprising inbound call information received from the call processor and determined within the fixed communication unit, the inbound call information comprising:

a plurality of portable communication unit identification codes for uniquely identifying each of a plurality of portable communication units receiving inbound calls; and a corresponding plurality of poll start time values comprising the time value of the real-time clock at the start of the sequence of periodic call set-up polls of each of the plurality of portable communication units having inbound calls for timing the duration of each of the sequences of periodic call set-up polls;

wherein the apparatus further comprises:

a transceiver coupled to the microprocessor for generating the more than one sequence of periodic call set-up polls on at least one of the plurality of wireless transmission channels for the plurality of portable communication units having inbound calls, and for monitoring periodically the at least one of the plurality of wireless transmission channels for a reply from one of the plurality of portable communication units polled; and a wireless call processing element coupled to the transceiver for establishing a wireless transmission link with a replying portable communication unit on the at least one of the plurality of wireless transmission channels for handling an inbound call.

16. The fixed communication unit of claim 15, wherein the microprocessor comprises:

a memory access element for accessing the memory to check each of the plurality of poll start time values prior to the generation of each of the sequences of periodic call set-up polls;

a first processor element coupled to the memory access element for continuing the sequence of periodic call set-up polls for one of the plurality of portable communication units in response to determining that the poll start time value corresponding to the portable communication unit is greater than a value calculated from the current time value of the real-time clock minus a pre-determined value; and a second processor element coupled to the memory access element for ending the sequence of periodic call set-up polls for one of the plurality of portable communication units in response to determining that the poll start time value corresponding to the portable communication unit is less than or equal to the value calculated from the current time value of the real-time clock minus the pre-determined value.

17. The fixed communication unit of claim 15, wherein the microprocessor comprises:

a third processor element for terminating the sequence of periodic call set-up polls for each of a plurality of portable communication units being polled on a wireless transmission channel, except for a replying portable communication unit, in response to receiving a reply from the replying portable communication unit on the wireless transmission channel; and a fourth processor element coupled to the third processor element for restarting from the beginning on another transmission channel the generation of the more than one sequence of periodic call set-up polls for each of the plurality of portable communication units whose call set-up polls are terminated by the third processor element.

* * * * *